United States Patent [19]

Tsuzuki

[11] 4,389,707
[45] Jun. 21, 1983

[54] ELECTRONIC CASH REGISTER

[75] Inventor: Hanzo Tsuzuki, Fussa, Japan

[73] Assignee: Casio Computer Co., Ltd., Tokyo, Japan

[21] Appl. No.: 212,498

[22] Filed: Dec. 3, 1980

[30] Foreign Application Priority Data

Dec. 18, 1979 [JP] Japan ................ 54-164548

[51] Int. Cl.³ .............................................. G06F 3/12
[52] U.S. Cl. ................................... 364/405; 364/900
[58] Field of Search ... 364/200 MS File, 900 MS File, 364/405; 235/92 AC, 92 CP, 2, 6, 7 R

[56] References Cited

U.S. PATENT DOCUMENTS

| | | | |
|---|---|---|---|
| 3,748,452 | 7/1973 | Ruben | 364/405 |
| 4,084,238 | 4/1978 | Masuo | 364/405 |
| 4,138,733 | 2/1979 | Tadakuma et al. | 235/7 R |
| 4,142,235 | 2/1979 | Tadakuma et al. | 364/405 |
| 4,159,533 | 6/1979 | Sakurai | 364/900 |
| 4,186,439 | 1/1980 | Shimura et al. | 364/405 |
| 4,213,179 | 7/1980 | Hamano et al. | 364/405 |
| 4,220,991 | 9/1980 | Hamano et al. | 364/405 |
| 4,276,598 | 6/1981 | Inoue et al. | 364/405 |

FOREIGN PATENT DOCUMENTS 2330178 8/1974 Fed. Rep. of Germany.
1524105 9/1978 United Kingdom.

*Primary Examiner*—Joseph F. Ruggiero
*Assistant Examiner*—Gary V. Harkcom
*Attorney, Agent, or Firm*—Frishauf, Holtz, Goodman & Woodward

[57] ABSTRACT

An electronic cash register has first and second total memories for storing data of accumulated sales amounts, and which is capable of two different types of settlement operations. It checks whether the first total memory has been reset before commencing the operation of resetting the second total memory, and resets the second total memory if the first total memory has been reset. A flag memory is provided for storing flag data such that when no flag data is stored in the flag memory upon actuation of the second settlement designation key, the total sales data in the first total memory is cumulatively stored in the corresponding memory areas of the second total memory and thereafter the data in the second total memory is supplied to the printing means.

1 Claim, 4 Drawing Figures

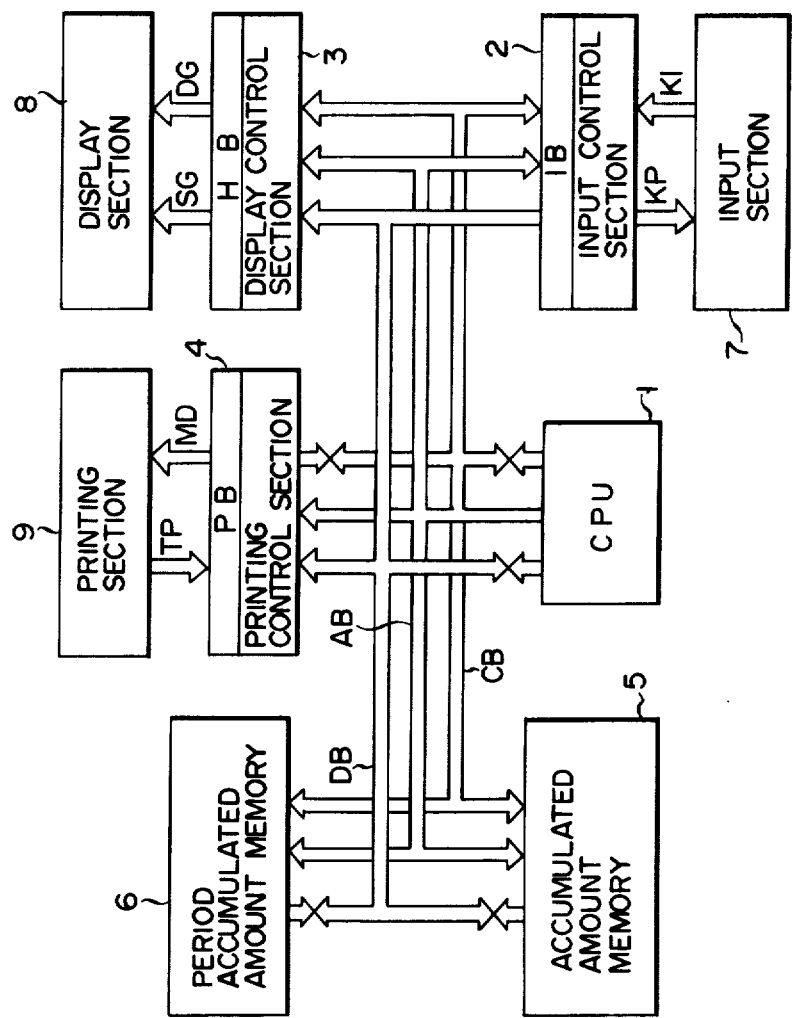
F I G. 1

F I G. 2
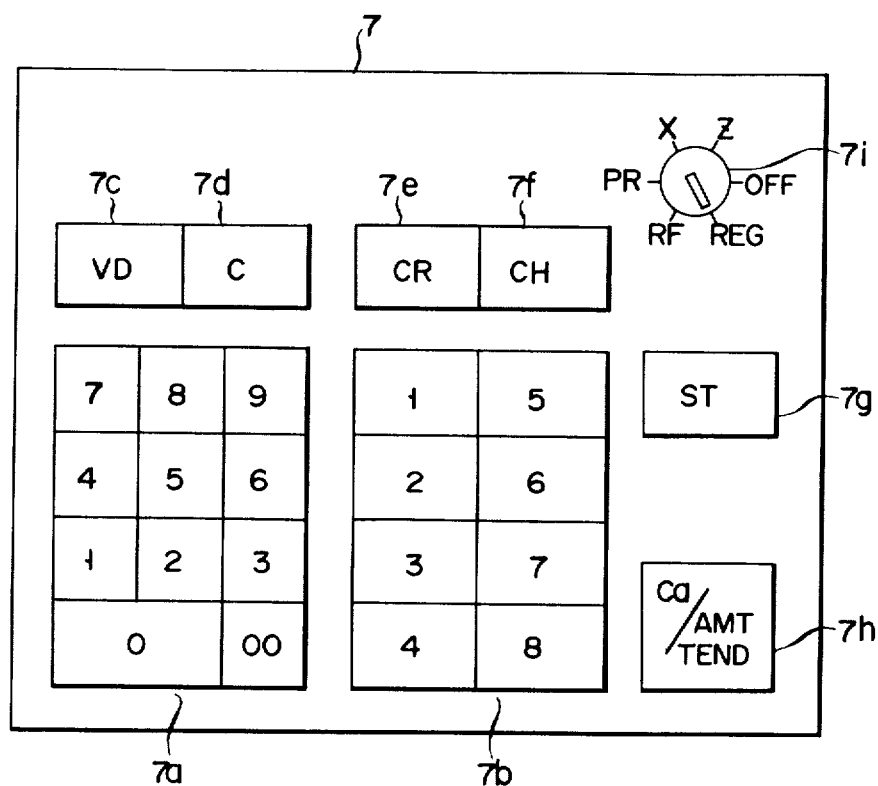

ELECTRONIC CASH REGISTER

BACKGROUND OF THE INVENTION

This invention relates to an electronic cash register capable of performing two different kinds of settlement processing operations including the reading, printing and clearing of total sales data.

An electronic cash register generally has a day sales amount data memory means for storing sales amount data for a number of classifications obtained for the day to permit daily settlement of the day sales amount data for each classification.

However, the prior-art electronic cash register of this kind has a drawback in that when an instruction for settling the period sales amount data is given without giving a day settlement instruction, the day sales amount data is not added to the period sales amount data although the period sales amount data is settled. Also, only the period sales amount data is settled after the period settlement operation is ended. Since the sales amount data for the day is not included in the period sales amount data, the period sales amount data has an inaccurate value, and this is inconvenient when totaling the sales amount data.

It is accordingly an object of this invention to provide an electronic cash register which permits the total sales data of commodities sold for a short time period such as one day to be printed as a daily settlement report according to classified items and which permits the total sales data of commodities sold over a long time period such as one week or one month to be printed as a period settlement report according to the classified items.

Another object of this invention is to provide an electronic cash register having a first total memory for storing the total sales data of commodities sold for a short time period and a second total memory adapted to sequentially accumulate, each time a settlement is made for the first total memory, such total sales data, in which when the settlement is made for the second total memory the total sales data of the commodities sold over that time period is read out always as a correct value so that an accurate period settlement report can be prepared.

SUMMARY OF THE INVENTION

In order to achieve the above-mentioned object, there is provided an electronic cash register comprising a keyboard having data input keys and function keys including first and second settlement designation keys; a central processing unit for processing data inputted through the keyboard; a first total memory connected to the central processing unit and having a plurality of memory areas for causing sales data inputted from the keyboard to be cumulatively stored according to the classified items of commodities sold; a second total memory connected to the central processing unit and having a plurality of memory areas for causing sales total data to be cumulatively stored according to the classified items of the commodities sold, the memory areas of the second total memory corresponding to those of the first total memory; and printing means for sequentially printing the total sales data read by the central processing unit out of the first total memory upon actuation of the first settlement designation key and for sequentially printing the total sales data read by the central processing unit out of the second total memory upon actuation of the second settlement designation key. The central processing unit also includes a flag memory for storing flag data indicating the time immediately following the readout and printing of the sales data in the first total memory. When no flag data is stored in the flag memory upon actuation of the second settlement designation key, the total sales data in the first total memory is cumlatively stored in the corresponding memory areas of the second total memory and thereafter the data in the second total memory is supplied to the printing means.

BRIEF DESCRIPTION OF THE DRAWINGS

FIG. 1 is a view showing the circuit construction of an electronic register.

FIG. 2 is a view showing an input section.

DETAILED DESCRIPTION

Figure 3:
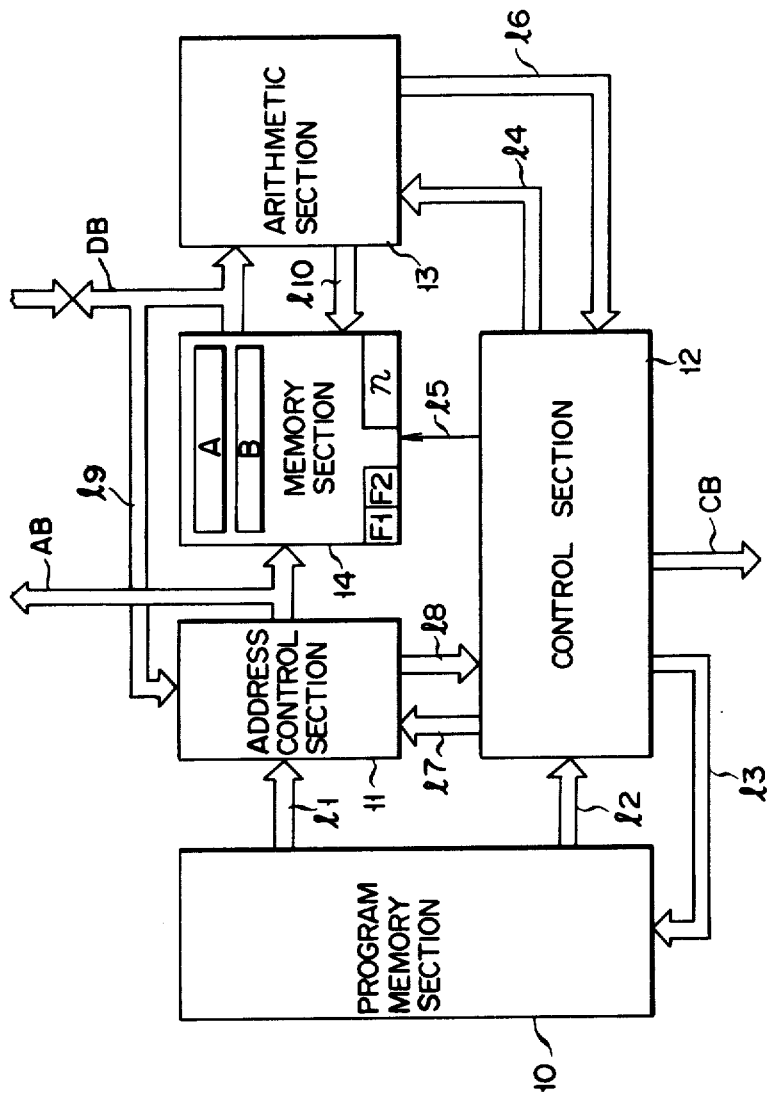
FIG. 3 is a view showing the circuit construction of a central processing unit.

FIG. 1 shows the circuit construction of an electronic register. Reference numeral 1 designates a central processing unit (hereinafter referred to as CPU). The CPU 1 includes an arithmetic section and a control section, and is also provided with a plurality of registers for storing arithmetic data, input data, display data, printing data, etc. An input control section 2, a display control section 3, a printing control section 4, an accumulated amount memory 5 (first total memory) and a period accumulated amount memory 6 (second total memory) are connected through a data bus DB, an address bus AB and a control bus CB to the CPU 1.

An input section 7 is connected to the input control section 2 and is supplied therefrom with a timing signal KP for sampling. With a keying operation in the input section 7, the timing signal KP is selected according to the operated key and transferred as a key input signal KI to an input buffer IB provided in the input control section 2.

A display section 8 is connected to the display section 3 and is given therefrom segment signals SG and digit signals DG which are obtained through the decoding of data in a display buffer HB in the display control section 3 and displayed in the display section.

A printing section 9 is connected to the printing control section 4. From the printing section 9 a printing position signal TP representing the printing position of a printing drum (not shown) is supplied to the printing control section 4, and from the printing control section 4 a printing drive signal MD which is produced at the time of the coincidence of the printing position signal TP and data memorized in a printing buffer PB is supplied to the printing section 9. In the printing section 9, predetermined hammers are driven according to the printing drive signal MD to obtain printing of sales amount data and the like on a journal sheet and also on a receipt sheet.

Now, the construction of the input section 7 will be described with reference to FIG. 2. This section includes entry keys 7a for coupling the numerical value of an amount of a commercial item or the like, department keys 7b for specifying the department to which the item belongs, a correction key 7c, a clear key 7d, a credit sale key 7e and a check sale key 7f. It also includes a subtotal key 7g for obtaining a total and a cash amount tendered key 7h for producing a receipt by coupling a cash sale amount or deposit amount. It further includes a mode switch 7i having "OFF", "REG", "RF", "PR", "X" and "Z" mode positions. The "OFF" position of the mode switch 7i is set when the electronic cash register is not used, the "REG" position is set for usual registering of the received amount, "RF" position is set for refunding part of the registered amount, the "PR" position is set for presetting data, the "X" position is set for non-destructively reading out memorized data, and the "Z" position is set for reading out the memorized data.

FIG. 3 shows the detailed circuit construction of the CPU 1. In the Figure, designated at 10 is a program memory section consisting of a ROM (read only memory) and accommodating various microcommands stored therein. The program memory section 10 supplies an address specification signal through a line $l_1$ to an address control section 11 and also supplies an operation code and a next address specification signal specifying the next address through a line $l_2$ to a control section 12. The next address signal is coupled from the control section 12 through a line $l_3$ to the program memory section 10, whereby consecutive microcommands are produced.

The control section 12 decodes the given operation code and supplies a corresponding arithmetic command signal specifying either addition or subtraction through a line $l_4$ to an arithmetic section 13. The control section 12 supplies a control signal to the outside circuit and also supplies a read/write (R/W) signal through a line $l_5$ to a memory section 14. It also effects alteration of the next address according to whether there are data coupled through a line $l_6$ and a carry signal. It further supplies an up-count or down-count specification signal through a line $l_7$ to an address counter in the address control section 11.

The address control section 11 further outputs an address through the address bus line AB and also specifies a row address in the memory section 14 for specifying successive column addresses according to the address counter provided in this section. When the specification of all the column addresses is ended, it supplies an end signal through a line $l_8$ to the control section 12. The memory section 14 includes arithmetic operation registers such as A and B registers, a daily settlement flag register $F_1$ for storing flag data for indicating whether or not to make settlement of the day sales amount data memorized in the accumulated sales amount memory 5 at the time of making settlement of the data memorized in the period accumulated sales amount memory 6, a period settlement flag register $F_2$ for storing flag data for indicating whether or not to effect settlement of the data in the period accumulated amount memory 6 after the accumulated sales amount memory 5 has been settled and an address designation register n for storing address data for designating the address of the total memory 5 or the period total memory 6. The data in memory section 14 is transferred through the data bus DB to arithmetic section 13 and through a line $l_9$ to the address control section 11. The arithmetic section 13 performs various specified arithmetic operations and the results of calculation are transferred through a line $l_{10}$ to the memory section 14.

Figure 4:
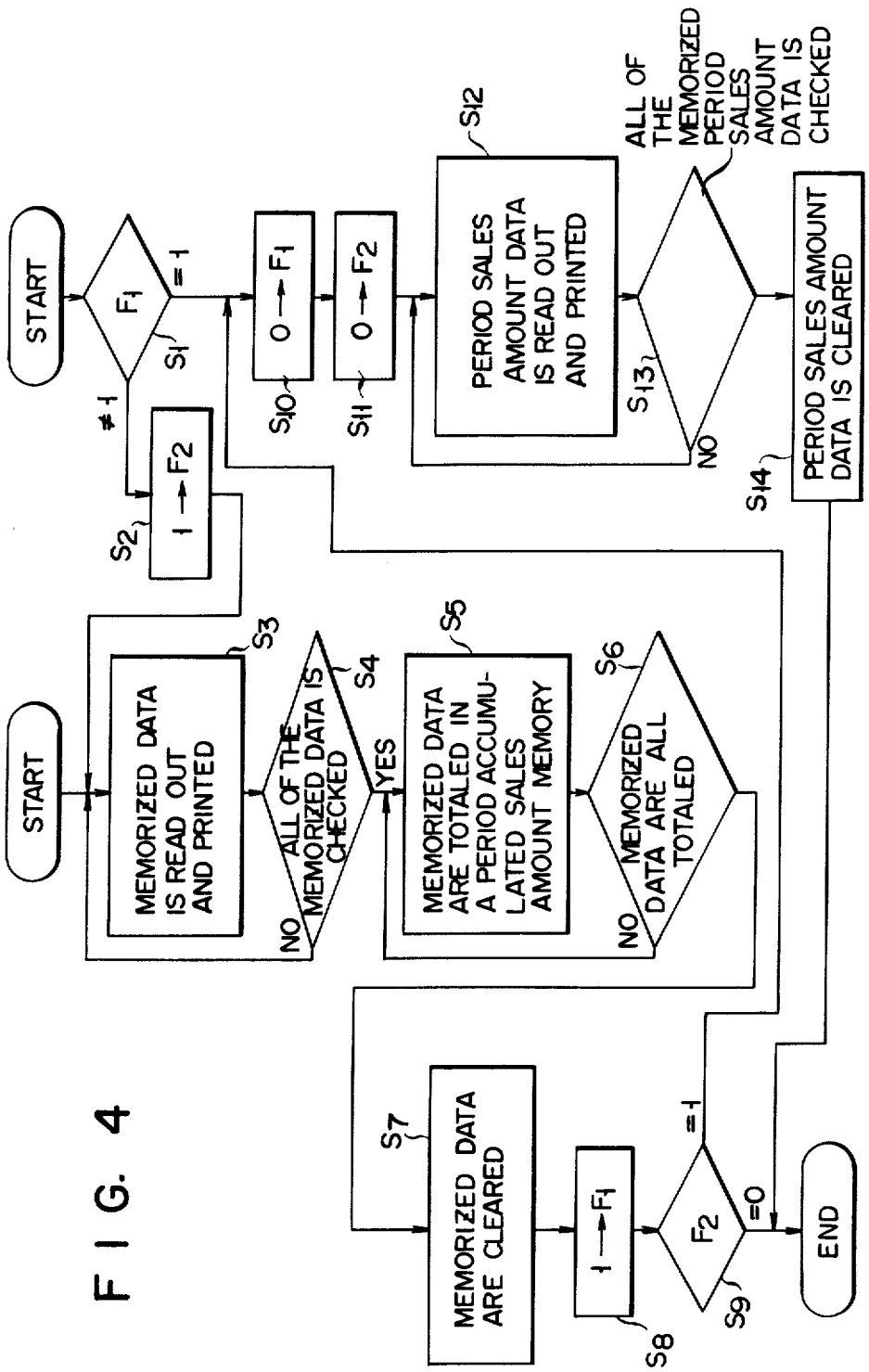
FIG. 4 is a flow chart illustrating the reset operation.

Now, the operation of the electronic cash register of the construction described above will be described. It is assumed that the sales data of the day is memorized in the accumulated sales amount memory 5 and that the day settlement flag $F_1$ is reset. In this state, by setting the mode switch 7i to the "Z" mode and then operating the check sale key 7f, a period settlement operation as shown by the flow chart of FIG. 4 is effected. In the first place, whether the day settlement flag $F_1$ is set is checked in a step $S_1$. If this flat is not set, the period settlement flag $F_2$ is set in a step $S_2$. Then, in a step $S_3$ the sales amount data of the day memorized in the accumulated sales amount memory 5 is read out therefrom and memorized in the A register of the memory section 14, and then it is coupled to the printing buffer PB for printing on a recording sheet in the printing section 9. Then, in a step $S_4$ whether all of the sales amount data of the day memorized in the accumulated sales amount memory 5 are printed is checked. If "NO" yields in this step, the operation is returned to the step $S_3$ of reading out the day's sales amount data and printing them on the recording sheet. When the printing is ended, the operation goes to a step $S_5$, in which the accumulated sales amount data of the individual days memorized in the accumulated sales amount memory 5 are read out and totaled in a corresponding memory region of the period accumulated sales amount memory 6. Then, in a step $S_6$ whether the sales amount data of the individual days in the accumulated sales amount memory 5 are all totaled in the accumulated sales amount memory 6 is checked. If "NO" yields in this step, the step $S_5$ is repeatedly executed. When all of the day's sales amount data are totaled in the period accumulated sales amount memory 6, the operation proceeds to a step $S_7$, in which the day's sales amount data memorized in the accumulated sales amount memory 5 are all cleared. Then, in a step $S_8$ the day settlement flag $F_1$ is set and, as a result, the settlement state of the accumulated sales amount memory 5 is memorized. Then, in a step $S_9$ whether the period settlement flag $F_2$ of the memory section 14 is set is checked. If this flag is found to be set, the day settlement flag $F_1$ is reset in a step $S_{10}$. Then, in a step $S_{11}$ the period settlement flag $F_2$ is reset. Subsequently, in a step $S_{12}$ the period sales amount data memorized in the period accumulated sales amount memory 6 are read out and printed on the afore-mentioned recording sheet in the printing section 9. Then, in a step $S_{13}$ whether all the period sales amount data memorized in the period accumulated sales amount memory 6 is checked. If "NO" yields in this step, the operation is returned to the step $S_{12}$ of reading and printing the period sales amount data. When the printing of all the period sales amount data is ended, the operation proceeds to a step $S_{14}$, in which the period sales amount data memorized in the period accumulated sales amount memory 6 are all cleared to bring an end to the settlement operation for the period which is executed without making the settlement for the day.

When the cash/deposit key 7h is operated after setting the mode switch 7i to the "Z" mode, the ordinary day settlement operation is executed. In this case, the consecutive steps $S_3$ through $S_7$ are executed, and then the day settlement flag $F_1$ is set in the step $S_8$. Then, in the step $S_9$ a decision that the period settlement flag $F_2$ is reset is rendered to bring an end to the day settlement operation.

When the check sale key 7f is operated in the "Z" mode without effecting the registering operation after the execution of the day settlement operation described above, in the step $S_1$ a decision that the day settlement flag $F_1$ is set is yielded, and only the settlement for the period is effected in the following consecutive steps $S_{10}$ through $S_{14}$. When a keying operation other than the period sales data settlement operation (i.e., operation of the check sale key 7f in the "Z" mode) is made after the afore-mentioned day settlement operation, the day settlement flag $F_1$ is immediately reset, and thus the afore-mentioned consecutive steps $S_1$ through $S_{14}$ are executed to obtain the settlement for the period and also the settlement for the day.

What is claimed is:

1. An electronic cash register comprising:
   a keyboard having data input keys and function keys, said function keys including first and second settlement designation keys;
   a central processing unit coupled to said keyboard for processing data inputted through said keyboard;
   a first total memory coupled to said central processing unit and having a plurality of memory areas for causing sales data inputted through said keyboard to be cumulatively stored according to classified items of commodities sold;
   a second total memory coupled to said central processing unit and having a number of memory areas corresponding to the number of memory areas of said first total memory for causing total sales data to be cumulatively stored according to the classified items; and
   printing means for causing the total sales data read by said central processing unit out of said first total memory to be sequentially printed when the first settlement designation key is operated, and for causing the total sales data read by the central processing unit out of said second total memory to be sequentially printed when the second settlement designation key is operated;
   said central processing unit including a flag memory for storing flag data indicating the time immediately following the readout and printing of the sales data in said first total memory, and means coupled to said flag memory for causing the total sales data of the classified items in said first total memory to be cumulatively stored in the corresponding memory areas of said total memory when no flag data is stored in said flag memory upon actuation of the section settlement designation key, and thereafter for causing the data in said second total memory to be supplied to said printing means for printing.

* * * * *

UNITED STATES PATENT AND TRADEMARK OFFICE
CERTIFICATE OF CORRECTION

PATENT NO. : 4,389,707

DATED : June 21, 1983

INVENTOR(S) : Hanzo TSUZUKI

It is certified that error appears in the above-identified patent and that said Letters Patent is hereby corrected as shown below:

COLUMN 6 (claim 1), line 12, change "for storing" to --in which--;

change "indicating the time" to --is stored--;

line 13, after "following" insert --the completion of--;

line 14, before "said first" insert --from-- and delete "in";

line 18, after "areas of said" insert --second--;

line 20, change "section" to --second--.

Signed and Sealed this

Eighth Day of November 1983

[SEAL]

Attest:

GERALD J. MOSSINGHOFF

Attesting Officer  Commissioner of Patents and Trademarks